May 28, 1929.  W. C. OCKER  1,715,304
TESTING AND TRAINING DEVICE FOR AVIATORS
Filed Feb. 18, 1928  2 Sheets-Sheet 2
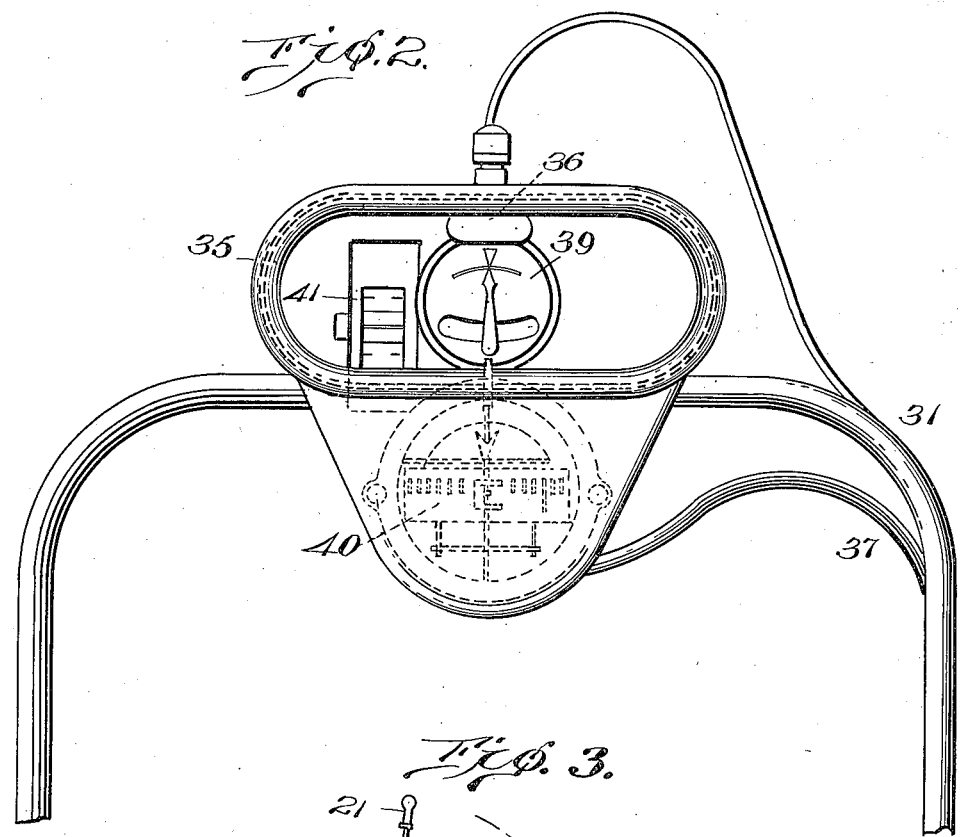
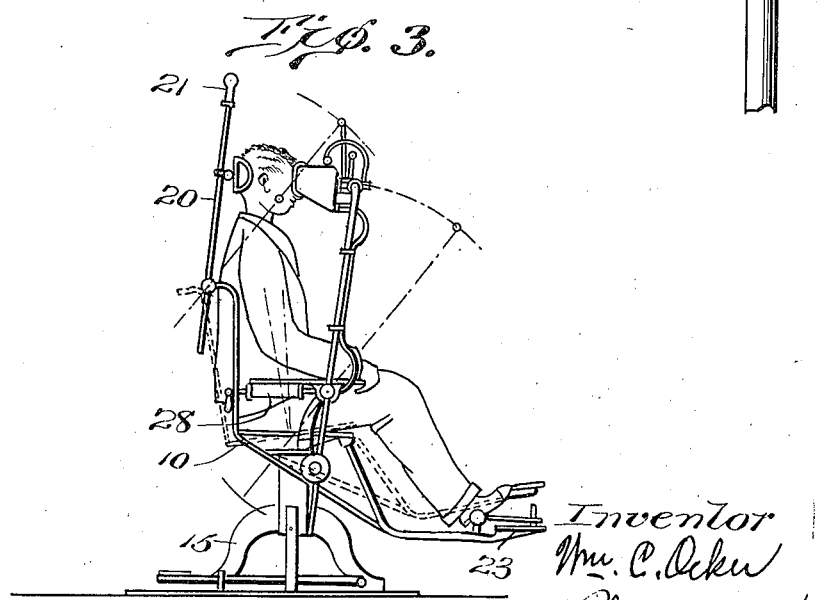

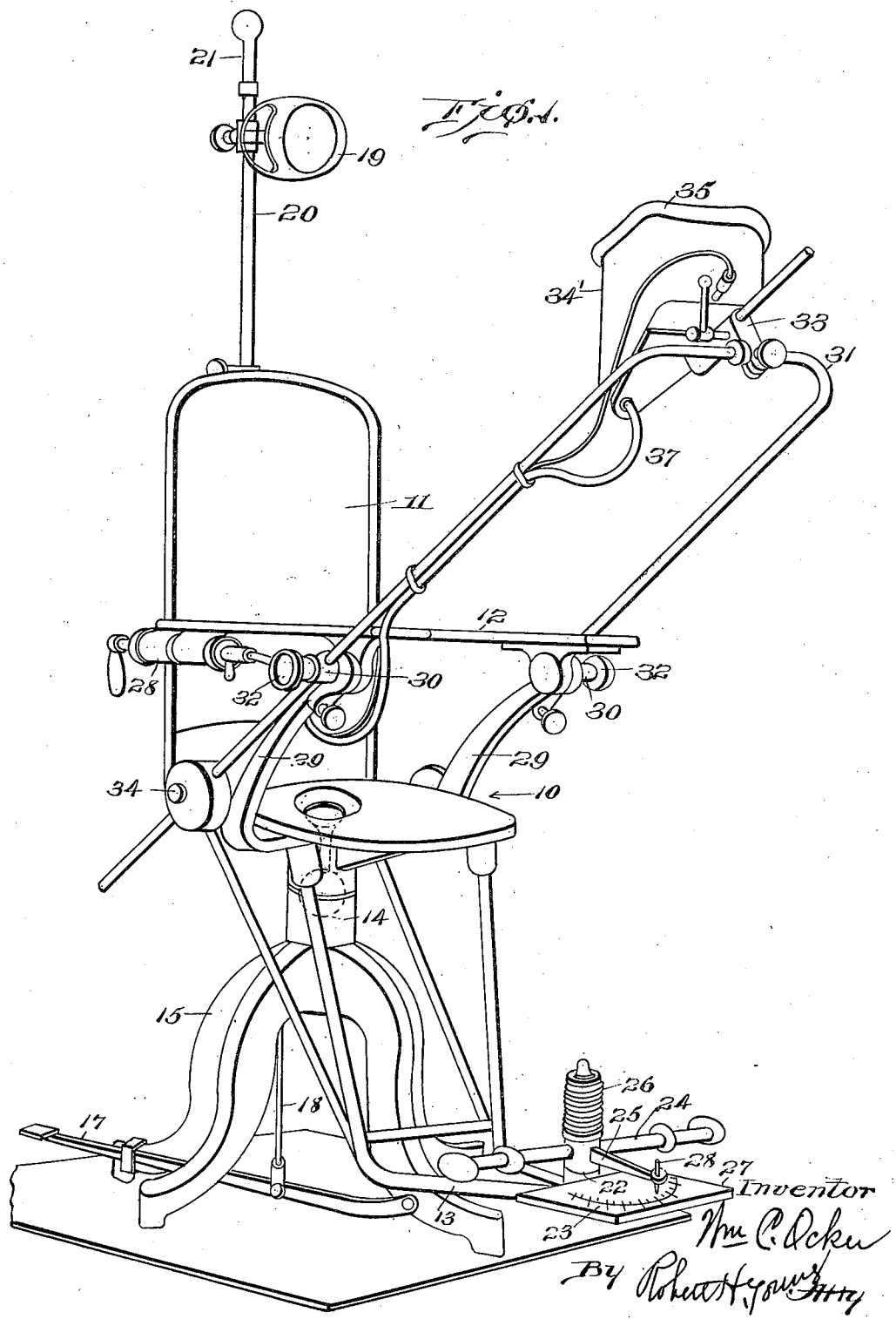

Patented May 28, 1929.

1,715,304

UNITED STATES PATENT OFFICE.

WILLIAM C. OCKER, OF THE UNITED STATES ARMY, CRISSY FIELD, SAN FRANCISCO, CALIFORNIA.

TESTING AND TRAINING DEVICE FOR AVIATORS.

Application filed February 18, 1928. Serial No. 255,487.

This invention relates in general to devices for testing and training candidates intending to take instruction in the art of flying aircraft and relates more particularly to a device combining the conventional whirling chair with an instrument board including a turn indicator and other devices, for observing the physiological reactions of prospective pilots to whirling motions of the said chair and to train them in the use of said instruments.

It is an object of my invention to combine the conventional whirling chair and instrument board so arranged as to exclude all other objects from the vision of the subject in such a manner as to thoroughly test and study the physiological reactions of their semi-circular canals to rapidly rotative movements.

Another object of my invention is to provide a device to thoroughly train prospective pilots in the use of their instruments and to instruct them and convince them that the instruments rather than their senses are to be believed.

Other objects of my invention will appear in the accompanying specification and claims and will be disclosed in the accompanying drawings, though it is to be understood, however, that I do not limit myself to the apparatus disclosed in the drawings and description, as the method and apparatus may be varied and improved as the need arises without departing from the spirit of my invention as disclosed in the claims.

Fig. 1 is a view in perspective of my apparatus, illustrating its component parts and their relation;

Fig. 2 is a view in elevation of the instrument hood forming a part of my invention;

Fig. 3 is a diagrammatic view in elevation of my apparatus in use.

My invention relates to a principle discovered by me wherein are combined the Jones-Barney turning chair, the orientator, the aeroplane, or anything that turns with such instruments as the bank and turn indicator, compass, altimeter, inclinometer and air-speed indicator in a manner such as indicated, for the purpose of training and safeguarding pilots while flying in darkness, fog, storm or any combination of these weather conditions.

The principle involved teaches the pilot that after one or more blind turns, he is suffering from a state of vertigo which is a reaction experienced by every normal person. The instruments mentioned are to be used to correct this error of our senses, and absolute reliance can be placed in them until such state of vertigo has passed. Also, this will reduce the amount of normal vertigo by about one half.

My discovery also covers the use of the foot-rudder in the training apparatus to register the amount of deviation from the time course by the pilot when in a state of vertigo.

In fog or blind flying, when the "feel" of the airplane leaves the pilot, there are two distinct hallucinations that all normal pilots are subject to: First, when a pilot is turning and then discontinues the turn and flies a straight course, his senses tell him that he is turning in the opposite direction; and, second, when he is turning and simultaneously descending, upon straightening out and flying level, he will have the sensation of turning in the opposite direction and ascending or descending. These reactions are not shown or explained to the student or old pilot by the usual Jones-Barney chair tests or any other tests now in existence. Therefore, my invention is of utmost importance as it thoroughly demonstrates and explains these reactions to the pilot, thus teaching him to place his faith in instruments and not his senses. These principles have not only been tested in the Jones-Barney chair, but also in the air by airplane, and have been found to be the same in both places.

The magnetic compass shown in the drawing is used to demonstrate that the magnetic compass causes confusion by frequently giving an illusion that the machine is turning around the compass whereas the compass dial itself is turning due to centrifugal force caused by the rapid turning. The bank and turn indicator, therefore, is used as a stabilizer for the magnetic compass.

One of the objects of the present invention is to provide means whereby a subject under examination as to physical qualifications for flying duty may be brought to a full realization of the inaccuracy of his physical and mental senses under conditions that may occur during flight.

Another object is to provide means whereby said subject may be caused to experience, on the ground, similar sensations that he would experience during flight in an airplane when said airplane became uncontrollable due to a loss of speed, or loss of ground or horizon visibility.

Another object is to provide an apparatus for examining said subjects that will permit the examiner to readily note and record the reactions of the subject during the various phases of the examination.

Referring more particularly to the drawings, I have illustrated a device comprising a chair 10 having a back rest 11, arm rests 12; and a foot rest 13. The chair is mounted for rotation on an angularly adjustable ball 14 releasably secured at the top of a base portion 15. A hand wheel 16 engaging suitable locking mechanism in the ball and the base portion provides means for determining the plane of rotation of the chair and its attendant back arm and foot rests on the base 15. A foot-lever 17 pivotally secured to the base is connected through a rod 18 to a conventional brake mechanism, mounted adjacent the ball 14 and adapted to lock the chair against rotation when desired. A head rest 19 is adjustably disposed on a rod 20 mounted for universal adjustment on the back rest 11 and one end of the rod is provided with a handle 21 by which the chair may be rotated. Forming part of the foot rest 13 is a vertical pivot post 22 and a platen 23. The pivot post provides a bearing for a spring controlled rudder bar 24 having a stylus post 25 secured thereto and normally overlying the platen 23. The spring 26 secured at opposite ends to the pivot post and the rudder bar, tensionally maintains the bar and its attendant stylus post in neutral position. A sheet of paper 27, having an arc divided in degrees described thereon, is secured to the platen in a suitable manner, and a stylus or pen 28 is secured in the post 25 and in contact with the paper on the arc line. Formed integral with the supports 29 of the arm rests 12 are pivot posts adapted to receive sleeves having diametrical bores to slidably receive the opposite ends of the U frame 31. The pivot posts are further provided with hand nuts 32, manipulation of which may lock the sleeve against rotation and the U clamp disposed therein against axial displacement.

The upper or closed end of the U frame is provided with an adjustable mounting block 33, and the opposite ends, or legs, are provided with counter-weights 34.

Reviewing the description, thus far, it will be seen that I have provided a chair having arm, back and foot rests comprising a tensionally controlled recording rudder bar. The chair being capable of rotation on a base and in a horizontal plane or planes varying from the horizontal as desired; also, that I have provided a U frame adapted to carry a mounting block, and which is capable of practically universal adjustment, and is also secured to the chair for rotation therewith.

The mounting block 33 provides a universally adjustable support for an instrument hood 34' disposed adjacent the closed end of the U frame. The various adjustments of the hood mounting block and its supporting U frame are provided so that, having a candidate or subject in the chair with his head against the rest 19, the hood may be adjusted against the subject's head and surrounding his eyes. It will be seen that by disposing the rest 19, and the hood 34' in various positions, the subject may be caused to sit erect or to bend forward, as desired. The hood 34' comprises a box open at one side, that side being provided with a padded edge 35, to provide a comfortable light seal around the subject's eyes when the apparatus is in use.

Arranged within the hood, and illuminated by means of a small electric light 36, is a bank and turn indicator 39, a magnetic compass 40 and an inclinometer 41. Air under pressure to operate the bank and turn indicator is supplied thru a flexible tube 37 from a small hand pump 38 conveniently disposed and secured to the chair.

The operation of this device is as follows: The subject under examination is placed in the chair with face in the open end of the light tight instrument hood 34' with the interior dark, the hood being moved by means of the frame 31 to a position as shown in Fig. 3. The subject is then entirely out of contact with his environment as far as sight is concerned. Preferably by the handle 21 the chair is rotated in one direction and the subject is questioned as to the direction he is turning. Taking for granted the subject is normal, his answer will invariably be correct. The chair is now gently slowed and stopped and the subject upon examination will state that he is turning in the opposite direction. In order to convince him that he is actually not in motion the instrument hood is illuminated so that the instruments therein will be visible. Another method of testing a subject with this device is to rotate the chair and then gradually slow the rotating motion. The sensation of turning to the left will be produced when he is actually turning to the right but at a slower rate of speed, and vice versa. By illuminating the interior of the instrument hood the subject will observe that the bank and turn indicator shows he is turning in the opposite direction his sensations would lead him to believe.

When turning with the instrument hood dark, the subject may be asked to operate the rudder bar to steer according to his sensations. Obviously he will move the rudder bar to correct for the direction of movement his sensations produce which as above set out, are erroneous. After the instrument hood has been illuminated and the subject shown the direction he is turning, the hood is moved away from his face and the sheet 23 will indicate the extent of the movement of the rudder bar in the wrong direction.

I claim:

1. The combination with a whirling chair, of a bank and turn indicator and a compass mounted in a hood secured to said chair and disposed for observation, exclusive of other objects, by a person seated in said chair.

2. The combination with a whirling chair, of an instrument hood, a bank and turn indicator and a compass in said hood, an adjustable mounting for said hood on said chair and a rudder bar pivotally disposed on said chair.

3. The combination with a whirling chair, of an instrument hood containing a bank and turn indicator and a compass, and a rudder bar tensionally resistant to movement pivotally mounted on said chair.

4. The combination with a whirling chair, of a bank and turn indicator, a compass, an inclinometer and a tensionally controlled recording rudder bar.

5. The combination with a whirling chair including a foot rest, of an instrument hood, a bank and turn indicator, a compass, and an inclinometer disposed in said hood; a rudder bar pivotally disposed on said foot rest, resilient means for resisting movement of said rudder bar, and means for recording the movement of said rudder bar.

6. A testing device of the kind described, including a whirling chair, a hood containing directional indicating instruments connected with said chair and a movable means simulating a control member of an aircraft on said chair.

In testimony whereof I affix my signature.

WILLIAM C. OCKER.